No. 891,372. PATENTED JUNE 23, 1908.
E. P. REICHHELM.
DUPLEX ROTARY BLOWER.
APPLICATION FILED APR. 15, 1905.
3 SHEETS—SHEET 1.
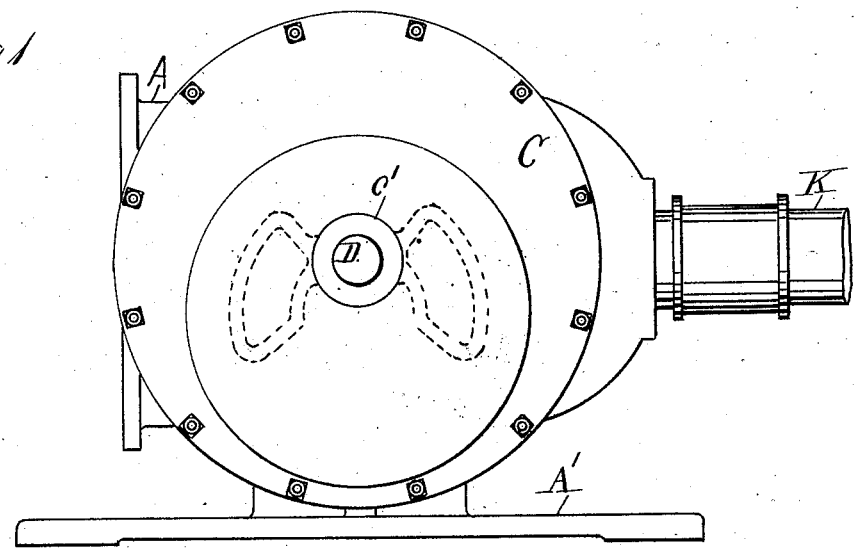
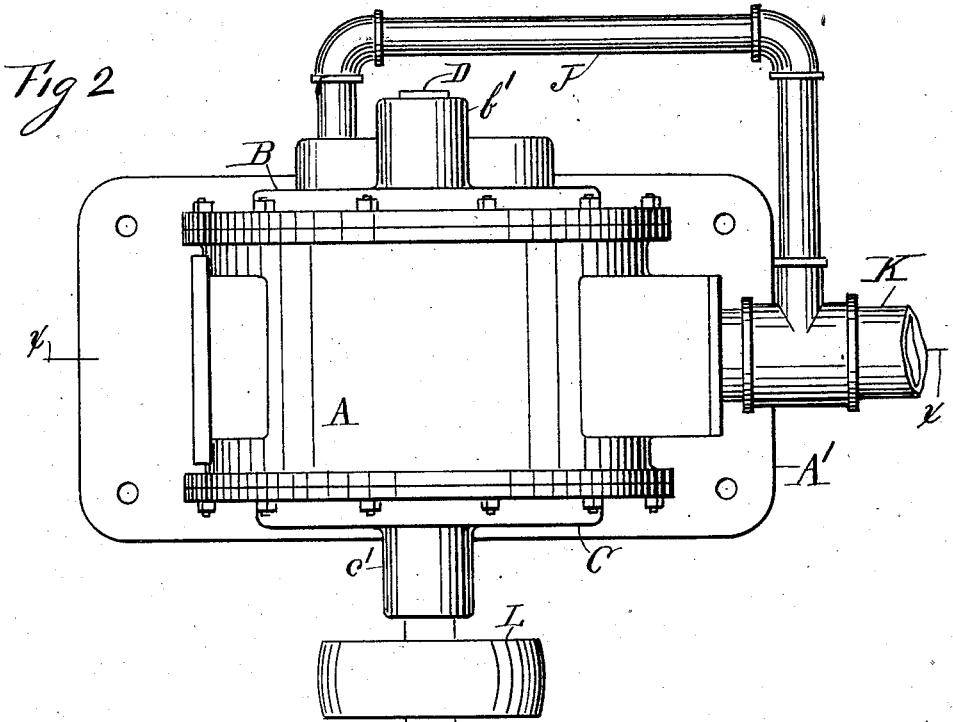

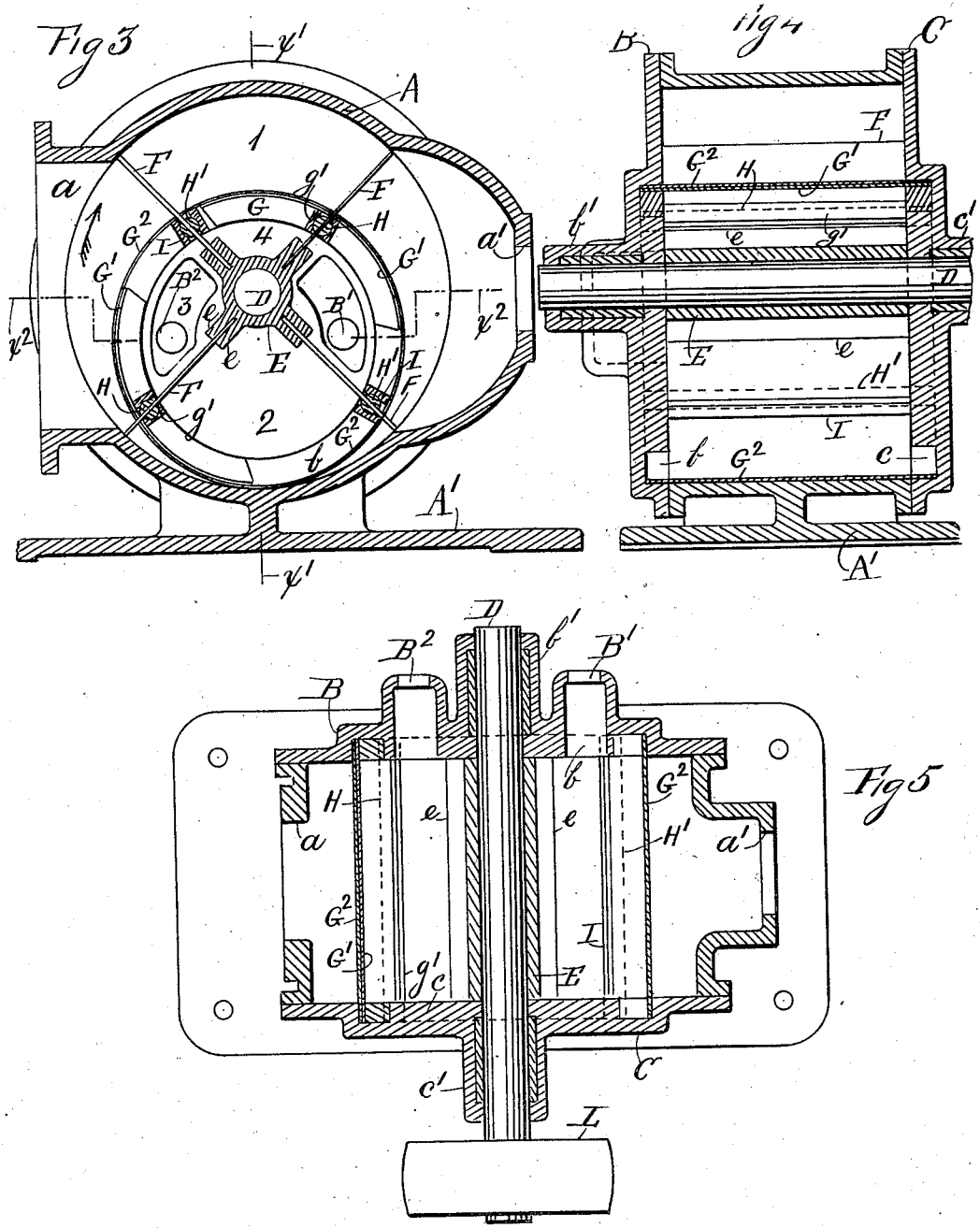

No. 891,372.

PATENTED JUNE 23, 1908.

E. P. REICHHELM.
DUPLEX ROTARY BLOWER.
APPLICATION FILED APR. 15, 1905.

3 SHEETS—SHEET 3.

Witnesses
O. Otto
Myron H. Cook

Inventor
Edward P. Reichhelm
By his Attorney
A. L. de Bonneville

UNITED STATES PATENT OFFICE.

EDWARD P. REICHHELM, OF BAYONNE, NEW JERSEY.

DUPLEX ROTARY BLOWER.

No. 891,372. Specification of Letters Patent. Patented June 23, 1908.

Application filed April 15, 1905. Serial No. 255,731.

*To all whom it may concern:*

Be it known that I, EDWARD P. REICHHELM, a citizen of the United States, and a resident of Bayonne, in the county of Hudson and State of New Jersey, have invented certain new and useful Improvements in Duplex Rotary Blowers, of which the following is a specification.

This invention relates to duplex rotary blowers. Its organization comprises a housing or cylinder, having inlet and outlet openings, a shaft arranged to rotate in the cylinder, blades securely fastened to the shaft, a segmental piston actuated by the blades, a main working chamber on the outside, and a secondary working chamber on the inside of the piston.

Figure 6:
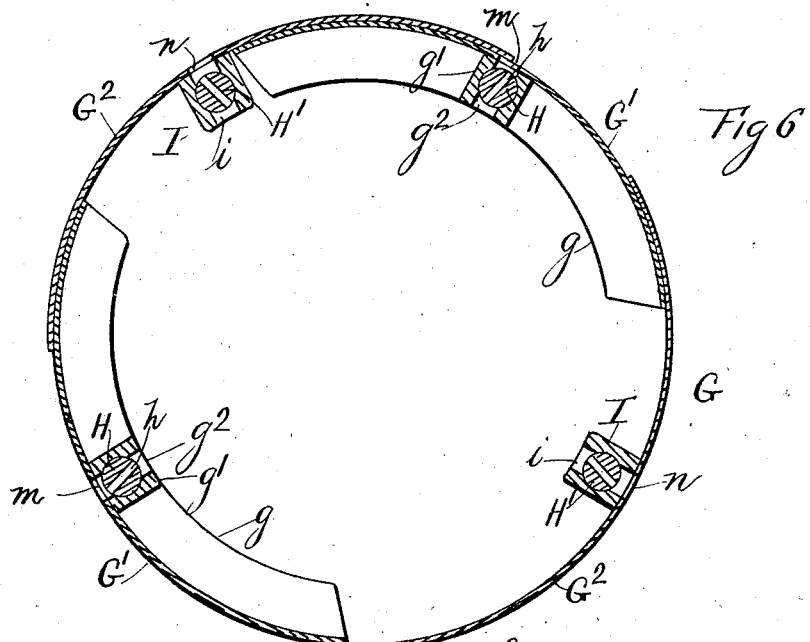
Figure 7:
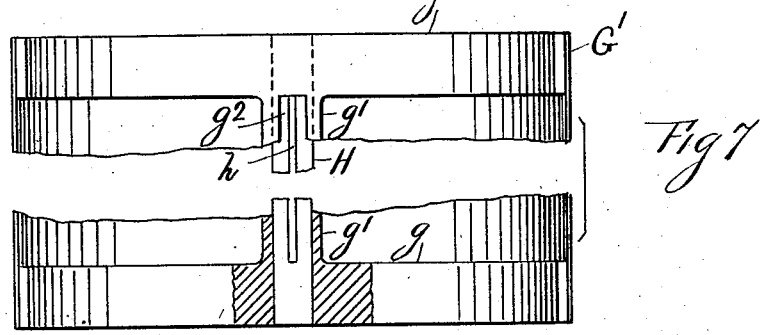
Figure 8:
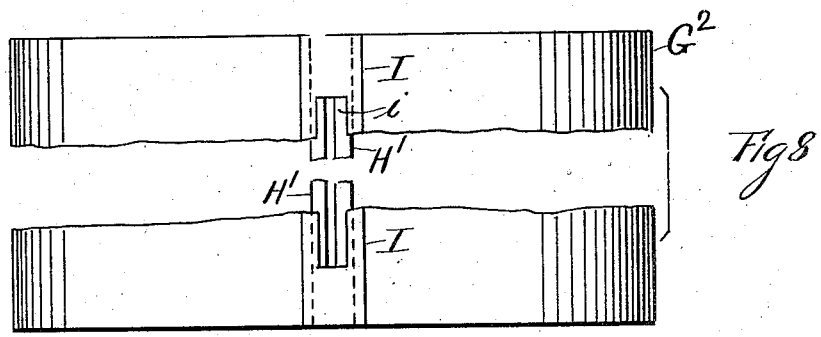

Referring to the drawings, Figure 1 represents an elevation of the blower, Fig. 2 shows a top plan view of Fig. 1; Fig. 3 is a section of Fig. 2, on the line $x, x$, Fig. 4 represents a section of Fig. 3 on the line $x', x'$, Fig. 5 shows a section of Fig. 2 on the line $x^2, x^2$, Fig. 6 is an enlarged cross-section of the piston of the blower, Fig. 7 shows a partial elevation and section of one of the segments or members of the piston, and Fig. 8 represents a partial elevation of another member of the piston.

The duplex blower is shown to comprise the housing or cylinder A, with the inlet opening $a$, and outlet opening $a'$, and carried on a suitable support or foot A'. To the sides of the cylinder are bolted the cylinder heads B and C. In the head B are formed the secondary inlet opening B' and secondary outlet opening $B^2$, the walls of both openings extending beyond the main portion of the head B, and arranged for connecting piping therewith. The heads B and C contain respectively the annular grooves $b$ and $c$, which are eccentric with the axis of the cylinder, and journal bearings $b'$ and $c'$ extend from the heads.

In the bearings $b'$ and $c'$ is supported the shaft D, to which is tightly secured the spider E with the forked arms $e$, in which latter are fastened the blades F, that fit between the walls of the cylinder. The annular grooves $b$ and $c$ inclose and guide eccentrically with the axis of the cylinder, the ends of a segmental piston G, which in the drawings is shown to consist of the four segments or members designated by G' and $G^2$. The segments G' have slots $m$ and are reinforced by the segmental ends $g$, joined by the reinforcing bars $g'$, which latter have slots $g^2$ that are concaved for the pins H, that also have slots $h$. The slots in the pins H span the distance between the adjacent faces of the segmental ends $g$, which faces are in the same planes as the inner faces of the cylinder heads. The segments $G^2$ have slots $n$ and have extending therefrom or connected thereto reinforcing bars I with the concaved slots $i$ for the pins H, similar to the pins H. The bars I extend the whole lengths of the segments $G^2$, and their end faces reach to the bottom faces of the said annular grooves. The sides of the segments overlap each other in all the positions of the piston.

By the disposition of the parts a duplex rotary blower is obtained, with a main or outer working chamber 1 in the cylinder on the outside of the piston, and a secondary or inner working chamber 2 on the inside of said piston. The secondary outlet opening $B^2$ of the secondary chamber 2, is connected by the piping J with the piping K, extending from the main working chamber 1, and a pulley L to drive the blower is mounted on the shaft D.

When operating the duplex blower the shaft D is rotated in the direction of the arrow (Fig. 1), and the blades F drive the segmental piston G, about its axial center, taking in air, vapor or other fluid through the inlet opening $a$, pocketing the charge between a pair of the blades F at the upper portion of the main working chamber 1, and discharging it through the outlet opening $a'$ into the piping K; and at the same time air or other vapor is drawn through the secondary inlet opening B', pocketed between a pair of blades at the lower portion of the piston, and discharged through the secondary outlet opening $B^2$ into the piping J, which in the drawings is shown connected with the outlet piping K. When the piston rotates on its axial center the chambers or pockets inclosed between the segments and blades change in capacity and volume during the revolutions of the blower. The chamber inclosed between the blades and the segments, when at the lowest position is at its maximum volume, and as the shaft turns in the direction of the arrow, the chamber decreases as shown at 3 and 4, the result of which secures a compression in the piston of the air or vapor. Centrifugal forces tend to maintain the segments of the piston G where they overlap in contact with each other, and force them to hug the outer walls of the annular grooves in the heads, preventing leakage between the main and secondary chambers.

The pins H and H' closely fit the blades F to also prevent leakage between the main and secondary working chambers. The said pins with their appurtenances form joints, to allow the blades F to assume the necessary angular positions through the segments of the piston, when the shaft D is rotating.

Having described my invention, I claim:

1. In a blower the combination of a cylinder, a segmental piston in the cylinder and eccentric with the axial line thereof, the segments of the piston overlapping each other, and two working chambers in the cylinder independent of each other.

2. In a blower the combination of a cylinder, a segmental piston therein located eccentrically with the axial line thereof, the sides of the segmental piston overlapping each other, a working chamber in the cylinder on the outside of the piston, and a working chamber on the inside of the piston.

3. In a blower the combination of a cylinder, a shaft arranged to rotate therein, blades extending from the shaft and securely connected therewith, a segmental piston in the cylinder and eccentric therewith, the segments of the piston with their sides overlapping each other, and having openings for the blades to pass therethrough.

4. In a blower the combination of a cylinder, cylinder heads connected thereto and having annular grooves eccentric with the cylinder, bearings in the cylinder heads, a shaft supported in the said bearings, blades securely connected with the shaft and extending to the walls of the cylinder, a segmental piston with its ends guided in the said annular grooves, and the sides of the segments of the piston overlapping each other, and having openings for the blades to pass therethrough.

5. In a blower the combination of a cylinder, a shaft arranged to rotate therein, a segmental piston in the cylinder and eccentric therewith, segments of the piston with their sides overlapping each other and having slots, reinforcing bars extending from the said segments and having concaved slots, pins having slots fitting the concaved slots of the reinforcing bars and forming joints, blades securely connected with the shaft of the blower and passing through the slots of the pins and the slots of the segments, and extending to the inner faces of the walls of the cylinder.

6. In a blower the combination of a cylinder, cylinder heads thereon having annular grooves eccentric with the axis of the cylinder, a segmental piston in the cylinder with its ends extending into the annular grooves of the heads, bearings in the heads, a shaft supported in the bearings, joints having slots in the segmental pistons, blades securely fastened to the shaft, and extending through the slots in the joints of the segmental piston to the walls of the cylinder, inlet and outlet openings in the cylinder outside of the segmental piston, and secondary inlet and outlet openings leading to the inside of the segmental piston.

7. In a duplex rotary blower the combination of a cylinder, a segmental piston eccentrically located therein, a shaft arranged to rotate in the cylinder, blades extending from the shaft and extending to the walls of the cylinder through openings in the segmental piston, a working chamber on the inside of the piston, a working chamber on the outside thereof, inlet and outlet openings for each chamber.

8. In a duplex rotary blower the combination of a cylinder, a segmental piston eccentrically located therein, segmental ends on a pair of the members of the piston, cylinder heads bolted to the cylinder and having annular grooves eccentric therewith, forming guides for the ends of the piston, joints in the members of the piston, a main working chamber in the cylinder outside of the piston, and a secondary working chamber inside of the piston, a shaft arranged to rotate in the cylinder, a spider secured to the shaft, blades fastened to the spider passing through the joints in the piston and extending to the walls of the cylinder, and arranged to turn the piston in the annular grooves, and an inlet and an outlet opening for each working chamber.

Signed at New York, in the county of New York and State of New York this 6th day of April A. D. 1905.

EDWARD P. REICHHELM.

Witnesses:
ALBERT M. LEIBMAN,
LOUIS SCHULMERICH.